March 20, 1934.  C. B. PENTECOST  1,951,882
APPARATUS AND METHOD OF OPERATION OF BRAKING SYSTEMS AND STOP LIGHTS
Filed July 18, 1928
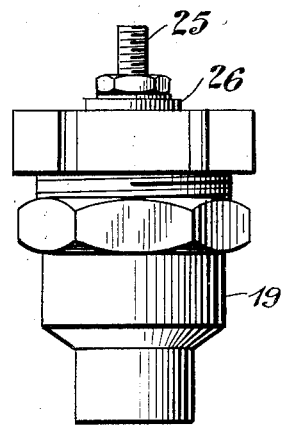
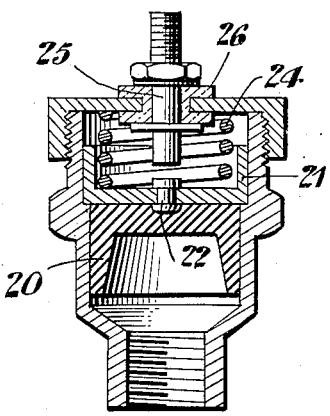
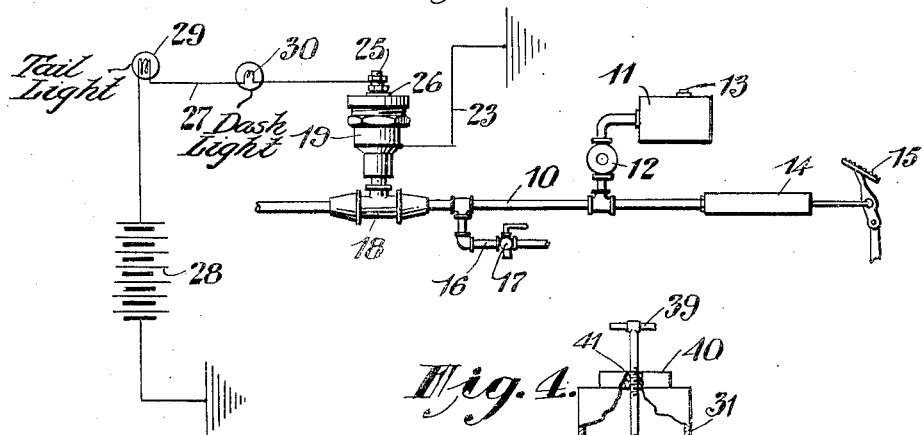
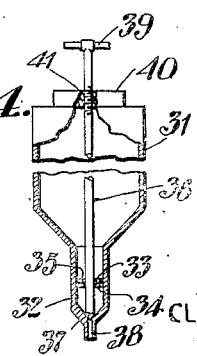
Inventor
CLEMENT B. PENTECOST
By his Attorney Patented Mar. 20, 1934

1,951,882

UNITED STATES PATENT OFFICE 1,951,882

APPARATUS AND METHOD OF OPERATION OF BRAKING SYSTEMS AND STOP LIGHTS

Clement B. Pentecost, East Orange, N. J.

Application July 18, 1928, Serial No. 293,716

8 Claims. (Cl. 177—339)

This invention relates to an automobile braking system and to a simple method of adjusting and operating it, and has particular reference to a fluid-operated system in which the pressure of the operator's foot on a pedal increases the fluid pressure to apply the brakes.

An object of the invention is to provide simple and efficient means whereby a stop light or other indicating means is so connected to the improved braking system that it responds instantly to the application of pressure to the system by the operator, and thus serves not only as a properly operating and efficient stop light but as an accurate indicator of the pressure of the system.

A further object of the invention is to present a simple method whereby the system can very readily be kept in accurate working condition with very little effort on the part of the operator.

In the usual fluid-operated system for car braking, the stop light is connected mechanically to the brake pedal. With this arrangement, the fluid system may be so full that the pedal can move to operate the brakes without moving far enough to operate the stop light. On the other hand, if the system is not sufficiently full of fluid, then when the brakes are operated and the stop light is actuated the stop light is not extinguished when the brakes are released, because the fluid pressure and the return springs on the brakes are not strong enough to return the pedal to its full normal position. In this instance the stop light will be left burning, thus discharging the battery. Only a relatively short time is required to reduce the battery when a 21 candle power lamp is allowed to continuously burn.

Furthermore, the fluids usually employed may be air, oil, water, glycerine, or the like. These gradually waste away due to leakage from one cause or another, and the normal pressure to be maintained in the system has to be periodically restored. This may be achieved by pouring more fluid into the system until it is full, or by pumping it in until a desired pressure is reached. In either case, it has proven to be rather difficult to know just when the proper pressure is achieved. If the pressure normally in the system when the brake pedal is off is too great, then the brakes drag and the bands not only are quickly worn out but burn, and a certain amount of the engine power is consumed by this drag. If the normal pressure is too small, then the brake pedal has to be pushed too far before it becomes effective.

To this end, the invention comprises a stop light or indicating device tied into the system and responsive to changes in the fluid pressure therein so that it responds instantly to indicate changes. Preferably the system has a pipe line connected to the brakes of the car and containing fluid such as oil, the pressure of which is to be normally maintained at a predetermined value, or to just fill the pipe line without being under pressure, and to be increased at will by the operation of a foot pedal to apply the brakes in the usual manner. To this system is preferably connected a pressure responsive switch in circuit with the indicator or stop light and so finely balanced that whenever the pedal is operated to apply the brakes the indicator or the stop light is actuated. More particularly the system is connected to a piston carrying an electrical switch member, said piston being responsive to a predetermined pressure in the system to close a circuit containing one or more lights, one of which may be a stop light and another of which may be an indicating light on the instrument board in front of the driver. A reservoir is connected to the system and associated with a pumping means preferably located on the dash in front of the driver so that the pressure in the system can quickly be brought up to any desired value. Means are also provided to release the pressure at will.

The novel method resides in the fact that the piston controlling the switch is set to close the switch when any pressure above a certain amount is produced. Therefore, if the driver of the car presses his pedal and finds that the stop or the dash indicating light is immediately illuminated, he knows that the normal pressure is correct. If he has to press his pedal quite a little before lighting the light, he known that the normal pressure has been reduced, probably by leakage, or that some of the liquid has leaked out of the system. He therefore will operate the pump until the stop or dash light is lighted, when he knows that the pressure is above normal. Then by allowing a little fluid to flow out or back into the reservoir until the light has just been extinguished, he knows that the pressure is the correct normal one and can proceed with safety and assurance. By setting the piston to respond to just the right pressure, the driver can easily keep the fluid in the system at the proper pressure and will be not only positive that the brakes are not dragging but that the stop light will operate the instant that the pedal is pressed. Thus the brakes are always kept in the condition of efficiency and a great deal of the usual trouble is avoided. The light or lights are consequently used for a double function: first, as a stop light; and second, as an indicator.

Further and more specific objects, features and advantages will more clearly appear from the detailed description given below taken in connection with the accompanying drawing which forms part of the specification, and which illustrates one embodiment of the invention, and in which Fig. 1 is a diagrammatic view of the system;

Fig. 2 is an elevational view of the fluid-operated switch;

Fig. 3 is a vertical section taken through the switch; and

Fig. 4 is an elevational view, broken away, of one form of pumping device which may be employed.

The drawing illustrates a fluid pipe 10 which may contain air, water, glycerine, oil, or other desirable fluid employed to operate the brakes of a modern automobile. A reservoir 11 is connected through a hand pump 12 to the line 10, and is provided with a filling plug 13. The line 10 is provided with a cylinder 14 in which a piston is operated by a foot pedal 15 under the driver's control to increase the fluid pressure in the line and cause the application of the brakes in any well known manner.

A by-pass pipe 16 is connected to line 10 and has a valve 17. This valve, if desired, may be arranged to drain the system. The pipe 16 may be connected to the atmosphere or to the reservoir 11 as desired. A T-union 18 is disposed in line 10 and supports a cylindrical casing 19. Within casing 19 is a movable member in the form of a piston preferably having a lower cup 20 of resilient material such as rubber, and an upper cup 21 of metal. These are connected together by a stud or pin 22 which also acts as an electrical contact which is grounded through the casing, to which grounded wire 23 is connected. A spring 24 resists the upward motion of the piston and is nicely calculated, only when a definite pressure is reached within the line 10, to permit contact between the stud 22 and a contact pin 25 supported in an insulating bushing 26 in the top of casing 19. To pin 25 a wire 27 connects to a grounded battery 28. In this wire 27 may be disposed one or more lights, such as a stop light 29 and a dash indicating light 30.

In Fig. 1 an alternate position of the light-controlling switch casing 19 is shown wherein it is connected to the cylinder 14 so as to respond to the pressure developed within said cylinder instead of being connected further away from the pedal 15 at a point in the line 10 so distant that the lag or inertia in the fluid may cause a delay in the operation of the stop light.

In Fig. 4 is shown a pump casing 31 having a restricted lower neck 32 in which slides a piston formed of two plates 33 and 34, the former provided with apertures 35. These plates are connected somewhat loosely together so as the piston moves upwardly in the neck 32 they will be slightly separated to permit liquid to pass through the apertures 35 between the plates to a point below the piston. On the opposite motion of the piston the two plates are held together firmly by the fluid pressure. The piston of the pump is supported on a piston rod 36, the lower end of which is pointed to act as a valve 37 engaging a valve seat in the bottom of neck 32 and controlling a passageway 38 leading to line 10. The upper end of the piston rod 36 has a handle 39. The casing 31 is provided with a cap 40 which in turn is provided with a threaded bore to receive a threaded portion 41 on the piston rod 36 to lock it with the valve 37 on its seat when desired. This pump is preferably located on the dash convenient to the hand of the driver.

In the operation of the device it will be observed that the indicator or stop light is one which will be positively operated whenever the system is in normal pressure condition, and that the failure of the light to work when the pedal is pressed even slightly is a sure indication that leakage has occurred. This can quickly be remedied by the manipulation of the pump on the dash which will restore the pressure to a definite value without the driver leaving his seat. Therefore the system comprises an indicator or stop light instantly operative by and responsive to the pressure in the system, but also serving to indicate the pressure condition of the system in combination with means such as the hand pump on the dash to quickly establish the proper pressure when desired. When the pressure is low the driver operates pump 12 with the brake pedal in normal position, until either light 29 or 30 lights up. He then knows that a pressure slightly above normal is in the line 10. By opening valve 17 just long enough to permit the lights to go out, the desired normal pressure is established and the slightest pressure of the operator's foot on the pedal 15 will cause the application of the brakes and the illumination of the stop light. Instead of operating valve 17, when the pump shown in Fig. 4 is employed, the piston 36 may be allowed to stand before the point 37 is seated. This allows some of the fluid to seep back through and around plates 33 and 34, thereby giving the same result. As the car is operated and the fluid gradually leaks out, it is only necessary to repeat this operation occasionally to keep the pressure up to an accurate and positive value without all the haphazard and annoying trials now necessary. This also prevents the uncertainty of knowing the exact condition of the braking system. Furthermore, knowledge of the condition of the braking system may be quickly and readily obtained.

While I have described my improvement in detail and with respect to a preferred form thereof, I do not desire to be limited to such details or form, since many changes and modifications may be made and the invention embodied in other forms without departing from the spirit and scope thereof in its broader aspects. Hence, I desire to cover all modifications and forms coming within the language or scope of any one or more of the appended claims. What I claim as new and desire to secure by Letters Patent, is:

1. The method of adjusting a fluid-operated automobile braking system having a fluid-pressure responsive light-controlling switch which comprises, increasing the pressure in said system until the switch is closed, and then releasing the pressure just sufficient to open the switch.

2. The method of adjusting a fluid-operated automobile braking system having a fluid-pressure responsive light-controlling switch adapted to close when a pressure just above a predetermined value is attained in the system, which comprises increasing the pressure in the system until the switch is closed, and then releasing the pressure just sufficient to open the switch.

3. An automobile braking system comprising means for establishing a pressure in said system, means under the driver's control to employ said pressure to apply the brakes, means readily accessible to the driver to regulate the pressure in said system, and an indicator responsive to the pressure condition of the system and observable by the driver, and pressure responsive means in the system connected to said indicator to guide it in accordance with variations in the pressure.

4. An automobile braking system comprising a fluid line in which a normal pressure is maintained, a pressure responsive switch associated with said line and adapted to be closed when the pressure in the line exceeds the normal value, a driver-operated pedal, means operated by the pedal for increasing the pressure to apply the brakes, and a pump associated with the line to increase the pressure independently of said pedal, and a light in circuit with and operated by said switch in response to pressure changes, said light being disposed in view of the driver.

5. An automobile braking system comprising a fluid line in which a normal pressure is maintained, a pressure responsive switch associated with said line and adapted to be closed when the pressure in the line exceeds the normal value, a pump in said line to increase said pressure, and a release valve connected to the line between the pump and the brakes, and a light in circuit with and operated by said switch in response to pressure changes said light being disposed in view of the driver.

6. An automobile braking system comprising a fluid line in which a normal pressure is maintained, a pressure responsive switch associated with said line and adapted to be closed when the pressure in the line exceeds the normal value, a pump connected to said line, and a reservoir connected to said pump, and a light in circuit with and operated by said switch in response to pressure changes said light being disposed in view of the driver.

7. An automobile braking system comprising a fluid line in which a normal pressure is maintained, a pressure responsive switch associated with said line and adapted to be closed when the pressure in the line exceeds the normal value, a driver-operated pedal, means operated by the pedal for increasing the pressure to apply the brakes, a pump associated with the line to increase the pressure independently of said pedal, a reservoir connected to said pump, and a light in circuit with said switch and disposed in view of the driver, and a release valve connected to the fluid line between the pump and the brakes.

8. An automobile braking system comprising a fluid line in which a normal pressure is maintained, a pressure responsive switch associated with said line and adapted to be closed when the pressure in the line exceeds the normal value, a driver-operated pedal, means operated by the pedal for increasing the pressure to apply the brakes, a pump associated with the line to increase the pressure independently of said pedal, a reservoir connected to said pump, a stop light in circuit with said switch, a dash light in series with said stop light, and a release valve connected to said line between the pump and the brakes.

CLEMENT B. PENTECOST.